US010509658B2

(12) United States Patent
Spitzer et al.

(10) Patent No.: US 10,509,658 B2
(45) Date of Patent: Dec. 17, 2019

(54) SYSTEM, METHOD, AND COMPUTER PROGRAM PRODUCT FOR SIMULTANEOUSLY DETERMINING SETTINGS FOR A PLURALITY OF PARAMETER VARIATIONS

(75) Inventors: John F. Spitzer, Wimberley, TX (US); Rev Lebaredian, Austin, TX (US); Yury Uralsky, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 712 days.

(21) Appl. No.: 13/543,196

(22) Filed: Jul. 6, 2012

(65) Prior Publication Data

US 2014/0012532 A1 Jan. 9, 2014

(51) Int. Cl.
*G06F 9/445* (2018.01)
*H04L 29/08* (2006.01)
*G09G 5/36* (2006.01)

(52) U.S. Cl.
CPC ........ *G06F 9/44505* (2013.01); *G06F 9/4451* (2013.01); *G09G 5/363* (2013.01); *G09G 2320/08* (2013.01); *H04L 67/34* (2013.01)

(58) Field of Classification Search
CPC ....................................................... G06F 7/38
USPC ........ 702/34, 61, 94, 104, 106, 127; 716/54, 716/113
See application file for complete search history.

(56) References Cited

U.S. PATENT DOCUMENTS

| 3,688,278 | A | * | 8/1972 | Sauvan et al. ................ 716/102 |
| 5,086,386 | A | | 2/1992 | Islam |
| 5,189,528 | A | * | 2/1993 | Takashima ........... H04N 1/4076 348/E5.081 |
| 5,671,351 | A | | 9/1997 | Wild et al. |
| 5,675,773 | A | * | 10/1997 | Devic .................. G06F 12/0875 345/522 |
| 5,958,058 | A | | 9/1999 | Barrus |
| 5,987,624 | A | | 11/1999 | Eglit |
| 6,044,476 | A | | 3/2000 | Ote et al. |
| 6,059,842 | A | * | 5/2000 | Dumarot ............. G06F 9/44505 706/47 |
| 6,306,063 | B1 | | 10/2001 | Horgan et al. |
| 6,314,479 | B1 | | 11/2001 | Frederick et al. |
| 6,535,307 | B1 | * | 3/2003 | Allen .................. B41F 33/0036 358/406 |

(Continued)

FOREIGN PATENT DOCUMENTS

| CN | 1752952 A | 3/2006 |
| CN | 101303672 A | 11/2008 |

(Continued)

OTHER PUBLICATIONS

Schichl et al., Interval Analysis on Directed Acyclic Graphs for Global Optimization, Journal of Global Optimization (2005) 33: 541-562.*

(Continued)

*Primary Examiner* — Michael J Dalbo
(74) *Attorney, Agent, or Firm* — Zilka-Kotab, PC

(57) ABSTRACT

A system, method, and computer program product are provided for simultaneously determining settings for a plurality of parameter variations. In use, a plurality of parameter variations associated with a device is identified. Additionally, settings for each of the plurality of parameter variations are determined simultaneously.

25 Claims, 4 Drawing Sheets

(56) References Cited

U.S. PATENT DOCUMENTS

| | | | |
|---|---|---|---|
| 6,646,653 B2 | 11/2003 | San et al. | |
| 6,654,952 B1 | 11/2003 | Nair et al. | |
| 6,753,881 B1 | 6/2004 | Callway et al. | |
| 6,768,519 B2 | 7/2004 | Fujita et al. | |
| 6,847,358 B1 | 1/2005 | Ford et al. | |
| 6,850,973 B1 | 2/2005 | Larson et al. | |
| 6,901,580 B2 | 5/2005 | Iwanojko et al. | |
| 7,034,828 B1 | 4/2006 | Drebin et al. | |
| 7,080,247 B2 | 7/2006 | Rochford, II et al. | |
| 7,243,371 B1 | 7/2007 | Kasper et al. | |
| 7,293,201 B2 | 11/2007 | Ansari | |
| 7,299,382 B2 | 11/2007 | Jorapur | |
| 7,603,445 B1 | 10/2009 | Fehrle | |
| 7,626,944 B1 | 12/2009 | Riddle | |
| 7,659,897 B1 | 2/2010 | Azar | |
| 7,778,936 B2 | 8/2010 | Adhikari | |
| 8,064,358 B2* | 11/2011 | Conoboy | H04L 41/082 370/252 |
| 8,171,342 B2 | 5/2012 | Wu | |
| 8,276,133 B1 | 9/2012 | Lebaredian et al. | |
| 8,280,864 B1 | 10/2012 | Herz et al. | |
| 8,296,781 B1 | 10/2012 | Lebaredian et al. | |
| 8,756,394 B1* | 6/2014 | Warner | G06F 13/1689 710/58 |
| 9,092,573 B2 | 7/2015 | Spitzer et al. | |
| 9,201,670 B2 | 12/2015 | Spitzer | |
| 9,250,931 B2 | 2/2016 | Spitzer et al. | |
| 9,275,377 B2 | 3/2016 | Spitzer | |
| 9,286,247 B2 | 3/2016 | Spitzer et al. | |
| 2001/0008021 A1 | 7/2001 | Ote et al. | |
| 2002/0031217 A1* | 3/2002 | Kiykioglu | H04L 12/2854 379/399.01 |
| 2002/0073415 A1 | 6/2002 | Kim et al. | |
| 2002/0083228 A1 | 6/2002 | Chiloyan et al. | |
| 2002/0095501 A1 | 7/2002 | Chiloyan et al. | |
| 2003/0023841 A1 | 1/2003 | Atherton et al. | |
| 2003/0033519 A1 | 2/2003 | Buckman et al. | |
| 2003/0055930 A1 | 3/2003 | Haneda | |
| 2003/0140333 A1 | 7/2003 | Odaka et al. | |
| 2003/0225917 A1 | 12/2003 | Partamian et al. | |
| 2004/0187103 A1 | 9/2004 | Wickham et al. | |
| 2004/0199615 A1 | 10/2004 | Philyaw | |
| 2004/0212610 A1 | 10/2004 | Hamlin | |
| 2004/0249618 A1 | 12/2004 | Fine et al. | |
| 2005/0076002 A1 | 4/2005 | Williams et al. | |
| 2005/0104888 A1 | 5/2005 | Ford et al. | |
| 2005/0120208 A1 | 6/2005 | Dobson | |
| 2005/0133067 A1 | 6/2005 | Bergman | |
| 2005/0225639 A1 | 10/2005 | Somers | |
| 2006/0112057 A1 | 5/2006 | Lai | |
| 2006/0132473 A1 | 6/2006 | Fuller et al. | |
| 2006/0188174 A1 | 8/2006 | Minadakis | |
| 2006/0200571 A1* | 9/2006 | Backman | H04L 41/0803 709/230 |
| 2006/0217920 A1* | 9/2006 | May | G06F 17/5063 702/130 |
| 2007/0002347 A1 | 1/2007 | Lai et al. | |
| 2007/0055153 A1* | 3/2007 | Simopoulos et al. | 600/437 |
| 2007/0066403 A1 | 3/2007 | Conkwright | |
| 2007/0098288 A1 | 5/2007 | Raskar et al. | |
| 2007/0153023 A1* | 7/2007 | Chladny | G06T 15/20 345/611 |
| 2007/0172140 A1 | 7/2007 | Kokemohr | |
| 2007/0268204 A1 | 11/2007 | Kawabe | |
| 2007/0277134 A1* | 11/2007 | Zhang et al. | 716/6 |
| 2007/0300203 A1* | 12/2007 | Jeong et al. | 716/18 |
| 2008/0005611 A1 | 1/2008 | Solyanik | |
| 2008/0040732 A1 | 2/2008 | Akiyama et al. | |
| 2008/0072077 A1 | 3/2008 | Orr | |
| 2008/0102957 A1 | 5/2008 | Burman et al. | |
| 2008/0133067 A1 | 6/2008 | DeMay | |
| 2008/0242423 A1 | 10/2008 | Kerr et al. | |
| 2008/0270569 A1 | 10/2008 | McBride et al. | |
| 2009/0011835 A1 | 1/2009 | Hansen et al. | |
| 2009/0057395 A1* | 3/2009 | He | G06K 9/6226 235/379 |
| 2009/0064053 A1 | 3/2009 | Crawford et al. | |
| 2009/0069084 A1 | 3/2009 | Reece et al. | |
| 2009/0094076 A1 | 4/2009 | Reddy | |
| 2009/0115778 A1 | 5/2009 | Ford et al. | |
| 2009/0210360 A1* | 8/2009 | Sankar | G06F 9/44505 706/10 |
| 2010/0162201 A1 | 6/2010 | Shnaiderman et al. | |
| 2010/0269137 A1 | 10/2010 | Nakajima et al. | |
| 2010/0318855 A1 | 12/2010 | Beg et al. | |
| 2010/0333081 A1* | 12/2010 | Etchegoyen | G06F 8/60 717/172 |
| 2011/0127954 A1 | 6/2011 | Walley et al. | |
| 2012/0101984 A1* | 4/2012 | Lintum | G06F 17/30306 707/609 |
| 2012/0155475 A1 | 6/2012 | Vasseur et al. | |
| 2012/0166098 A1* | 6/2012 | McCreary | G01N 30/34 702/25 |
| 2012/0272220 A1 | 10/2012 | Calcagno et al. | |
| 2013/0040629 A1* | 2/2013 | Sprigg | G06F 16/9535 455/419 |
| 2013/0173897 A1* | 7/2013 | Wang | G06F 9/4401 713/1 |
| 2013/0338966 A1 | 12/2013 | Spitzer | |
| 2014/0009470 A1 | 1/2014 | Spitzer et al. | |
| 2014/0011581 A1 | 1/2014 | Spitzer et al. | |
| 2014/0013094 A1 | 1/2014 | Spitzer et al. | |
| 2014/0013159 A1 | 1/2014 | Spitzer et al. | |
| 2014/0013303 A1 | 1/2014 | Spitzer | |

FOREIGN PATENT DOCUMENTS

| | | |
|---|---|---|
| CN | 101738499 A | 6/2010 |
| TW | 413798 B | 12/2000 |
| TW | 201205427 A | 2/2012 |

OTHER PUBLICATIONS

Advisory Action from U.S. Appl. No. 12/001,669, dated Oct. 14, 2011.

Final Office Action from U.S. Appl. No. 12/001,669, dated Jul. 21, 2011.

Notice of Allowance from U.S. Appl. No. 12/001,669, dated Aug. 31, 2012.

Non-Final Office Action from U.S. Appl. No. 12/001,669, dated Feb. 17, 2011.

Non-Final Office Action from U.S. Appl. No. 12/001,669, dated May 11, 2012.

Final Office Action from U.S. Appl. No. 12/001,504, dated Feb. 7, 2012.

Notice of Allowance from U.S. Appl. No. 12/001,504, dated Jun. 7, 2012.

Non-Final Office Action from U.S. Appl. No. 12/001,504, dated Aug. 5, 2011.

Advisory Action from U.S. Appl. No. 11/958,266, dated Feb. 22, 2012.

Final Office Action from U.S. Appl. No. 11/958,266, dated Oct. 19, 2010.

Final Office Action from U.S. Appl. No. 11/958,266, dated Dec. 12, 2011.

Notice of Allowance from U.S. Appl. No. 11/958,266, dated Jul. 2, 2012.

Non-Final Office Action from U.S. Appl. No. 11/958,266, dated Feb. 23, 2010.

Non-Final Office Action from U.S. Appl. No. 11/958,266, dated Jun. 21, 2011.

Non-Final Office Action from U.S. Appl. No. 12/352,268, dated Feb. 10, 2012.

Ribeiro-Filho, J. L. et al., "GAME: A Framework for Programming Genetic Algorithms Applications," IEEE, 1994, pp. 840-845.

U.S. Appl. No. 13/525,119, filed Jun. 15, 2012.

U.S. Appl. No. 13/543,212, filed Jul. 6, 2012.

U.S. Appl. No. 13/543,184, filed Jul. 6, 2012.

(56) References Cited

OTHER PUBLICATIONS

U.S. Appl. No. 13/543,228, filed Jul. 6, 2012.
U.S. Appl. No. 13/543,242, filed Jul. 6, 2012.
U.S. Appl. No. 12/352,268, filed Jan. 12, 2009.
Non-Final Office Action from U.S. Appl. No. 13/543,242, dated Oct. 6, 2014.
Final Office Action from U.S. Appl. No. 12/352,268, dated Jan. 28, 2015.
Office Action from Taiwan Patent Application No. 102123499, dated Nov. 25, 2014.
Non-Final Office Action from U.S. Appl. No. 13/543,212, dated Nov. 5, 2014.
Office Action from Taiwan Patent Application No. 102123862, dated Dec. 25, 2014.
Office Action from Taiwan Patent Application No. 102123858, dated Dec. 1, 2014.
Final Office Action from U.S. Appl. No. 13/543,184, dated Dec. 3, 2014.
Non-Final Office Action from U.S. Appl. No. 13/525,119, dated Feb. 5, 2015.
Hellerstein, J., "Optimizing Software Packages for Application Management," IEEE, 2008, pp. 1-8.
Advisory Action from U.S. Appl. No. 13/543,184, dated Feb. 12, 2015.
Office Action from Taiwan Patent Application No. 102123502, dated Jan. 21, 2015.
Unigraphics Basics, Nov. 14, 2004, retrieved from https://web.archive.org/web/20041114135544/http://homepages.cae.wisc.edu/~me232/ug/ug_basic.html.
Schmid, P., "Game Over? Core 2 Duo Knocks Out Athlon 64," Jul. 14, 2006, retrieved from http://www.tomshardware.com/reviews/core2-duo-knocks-athlon-64,1282-11.html.
Final Office Action from U.S. Appl. No. 12/352,268, dated Jan. 16, 2014.
Final Office Action from U.S. Appl. No. 12/352,268, dated Dec. 21, 2012.
Non-Final Office Action from U.S. Appl. No. 12/352,268, dated Jun. 19, 2014.
Non-Final Office Action from U.S. Appl. No. 12/352,268, dated Jun. 24, 2013.
Non-Final Office Action from U.S. Appl. No. 13/543,228, dated Jun. 13, 2014.
Nyanchama, M. et al., "The Role Graph Model and Conflict of Interest", Feb. 1999, pp. 3-33.
Notice of Allowance from U.S. Appl. No. 13/543,228, dated Nov. 21, 2014.
Non-Final Office Action from U.S. Appl. No. 13/543,184, dated Jul. 22, 2014.
Notice of Allowance from U.S. Appl. No. 13/543,228, dated Mar. 17, 2015.
Final Office Action from U.S. Appl. No. 13/543,212, dated Mar. 18, 2015.
Office Action from Taiwan Patent Application No. 102123858, dated Mar. 13, 2015.
Notice of Allowance from Taiwan Patent Application No. 102123862, dated Apr. 22, 2015.
Final Office Action from U.S. Appl. No. 13/543,242, dated May 15, 2015.
Notice of Allowance from U.S. Appl. No. 13/543,212, dated Jun. 8, 2015.
Office Action from Taiwan Patent Application No. 102123504, dated Jun. 22, 2015.
Non-Final Office Action from U.S. Appl. No. 13/525,119, dated Jul. 2, 2015.
Notice of Allowance from U.S. Appl. No. 13/543,184, dated Jul. 27, 2015.
Notice of Allowance from U.S. Appl. No. 13/543,212, dated Sep. 29, 2015.
Notice of Allowance from U.S. Appl. No. 13/543,242, dated Sep. 16, 2015.
Notice of Allowance from U.S. Appl. No. 13/525,119, dated Oct. 23, 2015.
Office Action from Chinese Patent Application No. 201310284846.8, dated Sep. 30, 2015.
Office Action from Taiwan Patent Application No. 102123854, dated Dec. 8, 2015.
Office Action from Chinese Patent Application No. 201310284846.8, dated Mar. 28, 2016.
Non-Final Office Action from U.S. Appl. No. 13/921,146, dated Sep. 15, 2016.
Chinese Office Action from Chinese Application No. 201310284893.2, dated Jun. 23, 2017.
Final Office Action from U.S. Appl. No. 13/921,146, dated Feb. 23, 2017.
Office Action from Chinese Patent Application No. 201310284893.2, dated Feb. 4, 2017.
Examiner's Answer to Appeal Brief from U.S. Appl. No. 13/921,146, dated Nov. 26, 2018.

\* cited by examiner

SYSTEM, METHOD, AND COMPUTER PROGRAM PRODUCT FOR SIMULTANEOUSLY DETERMINING SETTINGS FOR A PLURALITY OF PARAMETER VARIATIONS

FIELD OF THE INVENTION

The present invention relates to parameter analysis, and more particularly to determining settings based on parameter analysis.

BACKGROUND

Many products in existence today include one or more parameters that influence an overall experience associated with the product. For example, computer games and other software may have many parameters that determine a quality of rendering, audio, game play, etc. However, current techniques for arranging the parameters associated with these products have been associated with various limitations.

For example, currently, customers may be responsible for manually adjusting a plurality of parameters associated with a product in order to determine appropriate settings for that product. This may result in less than optimal settings for the product, time-consuming trial and error by the customer, etc. There is thus a need for addressing these and/or other issues associated with the prior art.

SUMMARY

A system, method, and computer program product are provided for simultaneously determining settings for a plurality of parameter variations. In use, a plurality of parameter variations associated with a device is identified. Additionally, settings for each of the plurality of parameter variations are determined simultaneously.

DETAILED DESCRIPTION

Figure 1:
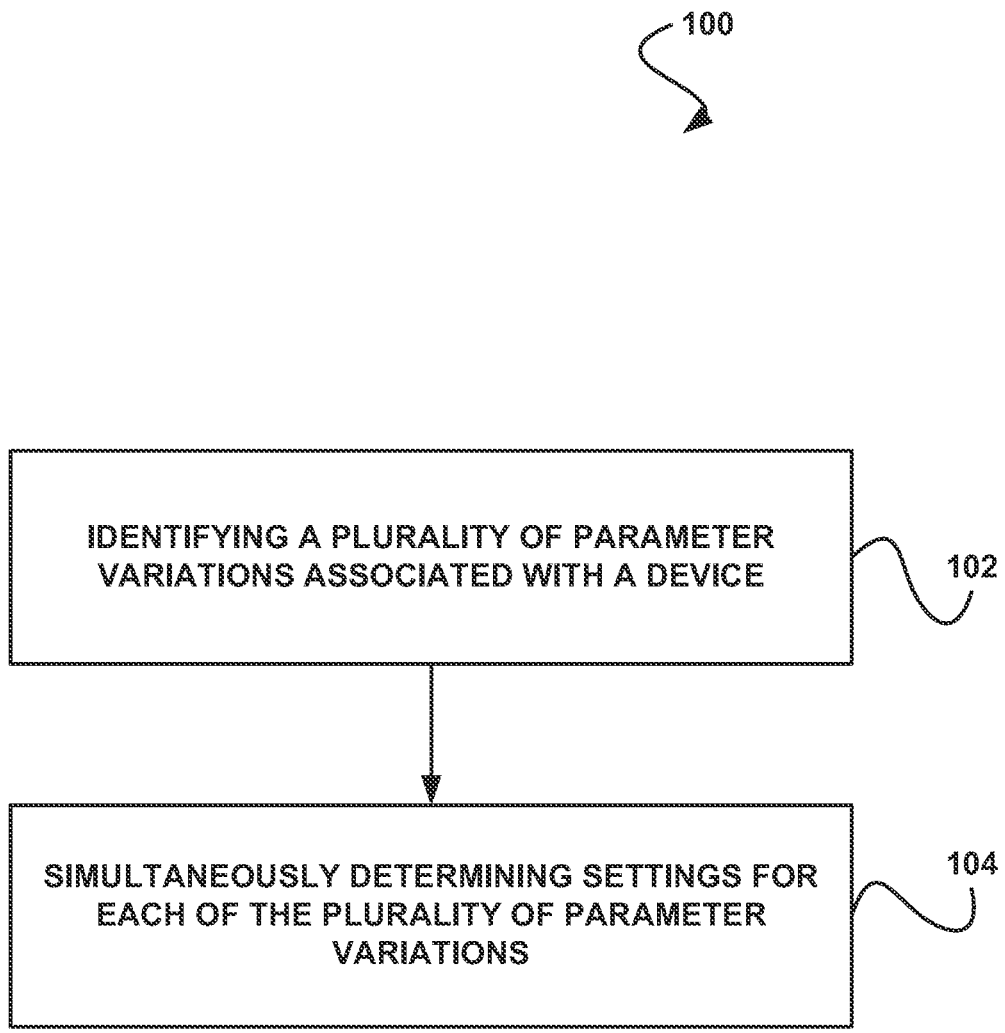
FIG. 1 shows a method for simultaneously determining settings for a plurality of parameter variations, in accordance with one embodiment.

FIG. 1 shows a method 100 for simultaneously determining settings for a plurality of parameter variations, in accordance with one embodiment. As shown in operation 102, a plurality of parameter variations associated with a device is identified. In one embodiment, the device may include an object such as a personal computer or other hardware element. In another embodiment, the plurality of parameter variations may include a plurality of unique variations of a plurality of different parameters.

Additionally, in one embodiment, the parameters may include any characteristics of the device. For example, the parameters may include hardware (e.g., a central processing unit (CPU), a graphics processing unit (GPU), random access memory (RAM), a motherboard, a display, etc.) installed within the device (e.g., a desktop computer, laptop computer, tablet computer, personal digital assistant, cellular telephone, etc.), software (e.g., an operating system, drivers, etc.) installed within the device, etc.

Further, in one embodiment, one or more of the parameters may be independently configurable. For example, each of the parameters may be able to be altered independently from the other parameters. In another embodiment, each of the parameters may be utilized by the device to perform one or more actions. In yet another embodiment, the parameter variations may include a plurality of different types of the parameter, which may include a size, magnitude, speed, etc. associated with the parameter. For example, if the parameter is a device CPU, then the variations of the parameter may include a manufacturer of the CPU, a speed of the CPU, a cache size of the CPU, etc. In another example, if the parameter is RAM, then the variations may include an amount of RAM, a speed of the RAM, a manufacturer of the RAM, etc.

Further still, in one embodiment, the plurality of parameter variations may be identified at a server. For example, each of the plurality of parameter variations may be sent from a user device having those parameter variations to a server via a network (e.g., a wireless network, a wired network, a cellular network, a satellite network, etc.). In another embodiment, the plurality of parameter variations may be stored in and retrieved from a database.

Also, in one embodiment, the plurality of parameter variations associated with the device may be identified based on one or more criteria. For example, a predetermined number of parameter variations that are determined to be the most popular user parameter variations (e.g., parameter variations most often used in customer devices, etc.) may be selected as the plurality of parameter variations associated with the device.

Additionally, as shown in operation 104, settings for each of the plurality of parameter variations are determined simultaneously. In one embodiment, the settings determined for each of the plurality of parameter variations may include optimized settings that manipulate one or more aspects of the plurality of parameter variations. In another embodiment, the settings for each of the plurality of parameter variations may include a monotonic set of predefined settings (presets). For example, settings for each of the plurality of parameter variations may include a monotonic set of presets that sequentially increases with respect to a first characteristic and sequentially decreases with respect to a second characteristic.

In another example, the monotonic set of presets may be ordered, and each successive preset within the set of presets may have an improved first characteristic and a decreased second characteristic when compared to the previous preset within the set of presets. In yet another embodiment, the first characteristic may be associated with quality (e.g., image quality, sound quality, experience quality, etc.), and the second characteristic may be associated with performance (e.g., speed, economy, efficiency, etc.). For example, a software element may be run on the device, and each successive preset within the set of presets may have an improved image quality of the software element and a decreased performance of the software element.

In another embodiment, the settings may be determined utilizing an algorithm. For example, the settings may be determined utilizing a greedy algorithm, an exhaustive algorithm, etc. In another embodiment, the settings may be determined by maximizing a first characteristic with respect to a second characteristic for each preset of the set of presets. For example, each of a plurality of settings for a parameter variation may have a first characteristic associated with quality and a second characteristic associated with performance, and the first characteristic may be optimized with respect to the second characteristic.

Further, in one embodiment, for each of the plurality of parameter variations, the settings may include a configuration of that parameter variation such that the device having that parameter variation produces a maximized output (e.g., image quality, etc.) while maintaining a threshold requirement (e.g., a minimum frame rate, etc.), while running a predetermined software element. In another embodiment, the software element may include a software program that may be installed or is to be installed within the device.

Further still, in one embodiment, simultaneously determining settings for each of the plurality of parameter variations may include creating a directed acyclic graph (DAG) including a plurality of nodes, where each of the plurality of nodes represents one of the plurality of parameter variations. In another embodiment, the nodes of the DAG may be directed based on one or more criteria. For instance, each of the plurality of nodes of the DAG may be directed within the DAG based on the speed associated with each node, where the speed is determined based on the device parameter variations represented by the node. In another embodiment, the nodes may be directed in the DAG such that a first node of the DAG may point to a second node of the DAG when it is determined that the second node of the DAG is definitively faster in one or more respects (e.g., with respect to processing speed, etc.) than the first node of the DAG.

Also, in one embodiment, simultaneously determining settings for each of the plurality of parameter variations may include adjusting one or more settings associated with each of the plurality of parameter variations. For example, for each of the plurality of parameter variations, one or more associated settings may be adjusted (e.g., turned on or off, increased, reduced, etc.) to determine the greatest possible magnitude of a first characteristic with respect to a second characteristic. In another embodiment, the settings determined for each of the plurality of parameter variations may include the settings for the plurality of parameter variations that yield the greatest possible magnitude of the first characteristic with respect to the second characteristic.

In addition, in one embodiment, simultaneously determining settings for each of the plurality of parameter variations may include successively adjusting a single setting for each of the plurality of parameter variations simultaneously. For example, for each of the plurality of parameter variations, a first determined setting may be adjusted to determine the greatest possible magnitude of a first characteristic with respect to a second characteristic. Additionally, after the first determined setting is adjusted, a second setting may be determined to be adjusted, where the second determined setting is adjusted for each of the plurality of parameter variations.

In another embodiment, simultaneously determining settings for each of the plurality of parameter variations may include starting at a minimum settings amount for each of the plurality of parameter variations and successively increasing a single setting for each of the plurality of parameter variations simultaneously. In yet another embodiment, simultaneously determining settings for each of the plurality of parameter variations may include starting at a maximum settings amount for each of the plurality of parameter variations and successively decreasing a single setting for each of the plurality of parameter variations simultaneously.

In still another embodiment, simultaneously determining settings for each of the plurality of parameter variations may include starting at both a maximum settings amount and a minimum settings amount for each of the plurality of parameter variations and successively decreasing a single setting from the maximum and increasing a single setting from the minimum for each of the plurality of parameter variations simultaneously, until optimal settings are determined that yield the greatest possible magnitude of the first characteristic with respect to the second characteristic.

Furthermore, in one embodiment, each of the plurality of parameter variations may influence how the settings are determined. For example, each of the plurality of parameter variations (or their respective node in the DAG) may vote for a first determined setting that is adjusted for each of the plurality of parameter variations. In another example, after the first determined setting is adjusted for each of the plurality of parameter variations, each of the plurality of parameter variations (or their respective node in the DAG) may then vote for a second determined setting that is adjusted for each of the plurality of parameter variations.

Further still, in one embodiment, each of the plurality of parameter variations may have a different level of influence as to how the settings are determined. For example, a population value may be associated with each of the plurality of parameter variations (or their respective node in the DAG). In another embodiment, a population value associated with a particular parameter variation may correspond to a predetermined number of users that have that parameter variation (e.g., installed within their device, etc.). In yet another embodiment, a population value associated with a particular parameter variation may correspond to a predetermined percentage of a total number of users that have that parameter variation.

In still another embodiment, the population value associated with a particular parameter variation may influence a magnitude (e.g., strength, etc.) of the influence exerted by the particular parameter variation with respect to how the settings are determined. For example, a vote by the particular parameter variation for a determined setting that is adjusted for each of the plurality of parameter variations may be increased proportionately by the population value associated with the particular parameter variation (e.g., by multiplying the vote by the population value, etc.). In this way, popular parameter variations used by a large user base may have more influence as to how the settings are determined.

Also, in one embodiment, an index value (e.g., an influence value, etc.) may be associated with each of the plurality of parameter variations (or their respective node in the DAG). In another embodiment, the index value associated with a particular parameter variation may correspond to an ability of the particular parameter variation to run a predetermined software element at a predetermined frame rate. For example, the index value may be −1 if the particular parameter variation cannot run the predetermined software element at the predetermined frame rate. In another example, the index value may be zero if the particular parameter variation can run the predetermined software element utilizing one or more minimum settings at the predetermined frame rate. In yet another embodiment, the index value may be (n−1) if the particular parameter variation can run the predetermined software element utilizing one or more maximum settings at the predetermined frame rate, where n equals the number of parameters represented by each node in the DAG.

In still another embodiment, the index value associated with a particular parameter variation may influence a magnitude (e.g., strength, etc.) of the influence exerted by the particular parameter variation with respect to how the settings are determined. For example, a vote by the particular parameter variation for a determined setting that is adjusted for each of the plurality of parameter variations may be increased or decreased proportionately by the index value associated with the particular parameter variation (e.g., by multiplying the vote by the index value, etc.). In this way, parameter variations that are more likely to use the settings may have more influence as to how the settings are determined.

Additionally, in one embodiment, a disagreement may be identified between the plurality of parameter variations (or their respective nodes in the DAG) during voting for determined settings to be adjusted for each of the plurality of parameter variations. For example, a portion of the plurality of parameter variations (or their respective nodes in the DAG) may vote for one particular setting that is to be adjusted for each of the plurality of parameter variations, and another portion of the plurality of parameter variations (or their respective nodes in the DAG) may vote for another particular setting that is to be adjusted for each of the plurality of parameter variations.

Further, in response to the identification of the disagreement between the plurality of parameter variations, the plurality of parameter variations may be divided into a plurality of sub groups (e.g., smaller DAGs, etc.). For example, if a predetermined percentage of the plurality of parameter variations (or their respective nodes in the DAG) vote for a particular setting different from settings voted for by other parameter variations (or their respective DAG nodes), the predetermined percentage of the plurality of parameter variations may be removed from the DAG and may be placed in a sub DAG for settings determination. In this way, settings determination may be more efficiently determined for the parameter variations in each sub group.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
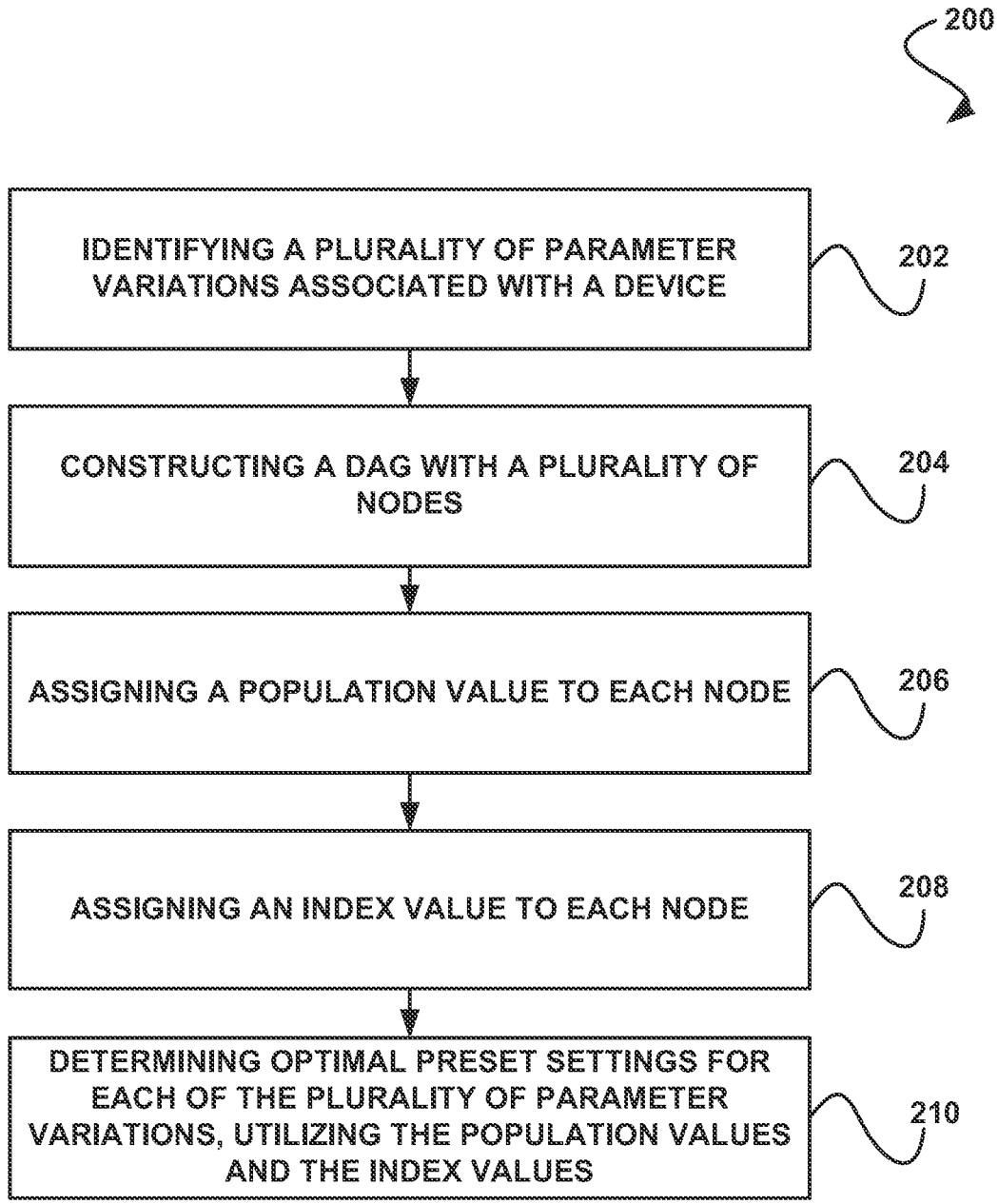
FIG. 2 shows a method for simultaneously determining a plurality of optimal settings, in accordance with another embodiment.

FIG. 2 shows a method 200 for simultaneously determining a plurality of optimal settings, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a plurality of parameter variations associated with a device is identified. In one embodiment, the plurality of parameter variations may include parameter variations associated with a display of the personal computer. For example, the plurality of parameter variations may include a screen resolution of the personal computer. In another embodiment, the plurality of parameter variations may include parameter variations associated with the rendering of graphics by the personal computer. For example, the plurality of parameter variations may include specifics of system hardware installed within the device (e.g., CPU specifics, GPU specifics, motherboard specifics, RAM specifics, etc.), specifics of system software installed within the device, etc.

Additionally, as shown in operation 204, a DAG with a plurality of nodes is constructed, where each of the plurality of nodes corresponds to one of the plurality of parameter variations. In one embodiment, the nodes in the DAG may be directed based on one or more rules. For example, the nodes may be directed within the DAG based on the speed associated with each node, where the speed is determined based on the parameter variations represented by the node. In another embodiment, the nodes may be directed in the DAG such that a first node of the DAG may point to a second node of the DAG when it is determined that the second node of the DAG is definitively faster in one or more respects (e.g., with respect to processing speed, etc.) than the first node of the DAG.

Also, in one embodiment, each node in the DAG may represent a unique variation of a plurality of possible parameters associated with the device. For example, the plurality of possible parameters associated with the device may include a device CPU, a device GPU, and a device resolution, and each node in the DAG may represent a unique combination of a particular device CPU, device GPU, and device resolution. In this way, a first node pointing to a second node within the DAG signifies that the plurality of parameter variations associated with the device that are represented by the second node in the DAG offer definitively better processing speed and performance than the plurality of parameter variations associated with the device that are represented by the first node in the DAG.

Further, as shown in operation 206, a population value associated with each node is assigned to each node. In one embodiment, a plurality of population values may be obtained as a result of analytical operations. In another embodiment, the plurality of population values may include telemetry data. In yet another embodiment, the plurality of population values may be retrieved from a population value database. In still another embodiment, the population value assigned to a node may represent a user population that owns a device having the parameter variations corresponding to that node.

Further still, as shown in operation 208, an index value associated with each node is associated to each node. In one embodiment, a plurality of index values may be determined for a node by calculating an ability of the particular parameter variation represented by that node to run a predetermined software element at a predetermined frame rate. In another embodiment, an index value may be determined for a node based on the location of the node within the DAG. For example, stronger nodes in the DAG may be assigned higher index values.

Also, as shown in operation 210, optimal preset settings are determined for each of the plurality of parameter variations, utilizing the population values and the index values. In one embodiment, the optimal preset settings may include a monotonic set of presets for the device. In another embodiment, the monotonic set of presets may be determined with respect to one or more software elements installed on the device. For example, the monotonic set of presets may be determined for an instance of an application (e.g., video game software, media playback software, etc.) installed on the device. In yet another embodiment, the monotonic set of presets may be determined with respect to one or more software elements to be installed on the device e.g., not yet installed on the device, etc.).

In yet another embodiment, the monotonic set of presets may represent device settings (both dependent and independent) that impact the way the device runs the one or more software elements. For example, each of the monotonic set of presets may dictate a color depth of displayed graphics provided by the device, a texture mapping level of displayed graphics provided by the device, a texture compression of displayed graphics provided by the device, a lighting model used by the device during the display of graphics, etc.

In addition, in one embodiment, determining the optimal preset settings may include determining a plurality of performance levels for the device. For example, a plurality of descending performance levels (e.g., from a maximum performance level to a minimum performance level, etc.) may be determined for the device (e.g., utilizing one or more benchmarks, etc.), where each successive performance level indicates that the device performs (e.g., runs, computes, etc.) at a slower rate, less efficiently, or in an otherwise less desirable manner when compared to the previous level. In another embodiment, the performance level may be associated with a level of resources used by the device. For example, the performance level may indicate an amount of processing resources used by the device, an amount of software resources used by the device, an amount of network resources utilized by the device, a frame rate provided by the device, etc.

Further, in one embodiment, determining the optimal preset settings may include determining a plurality of image quality levels for the device. For example, a plurality of ascending image quality levels (e.g., from a minimum image quality level to a maximum image quality level, etc.) may be determined for the device, where each successive image quality level indicates that the image quality displayed by the device (e.g., one or more of the resolution, color, detail, etc.) increases when compared to the previous level.

Further still, in one embodiment, each of the plurality of performance levels may be associated with one of the plurality of image quality levels for the device. For example, each successively descending performance level may be associated with a successively increasing image quality level, such that as the performance of the device decreases, the image quality produced by the device increases. In another embodiment, the image quality level may be maximized for each of the plurality of performance levels, based on the plurality of parameter variations of the device.

For example, for each determined performance level, a maximum image quality may be determined that can be provided by the device based on the plurality of parameter variations of the device. In one embodiment, the maximum image quality may be calculated utilizing a greedy algorithm. In another embodiment, the maximum image quality may be calculated utilizing an exhaustive algorithm. Of course, however, the maximum image quality for each performance level may be calculated in any manner. In this way, the presets may be monotonically increasing in terms of image quality and monotonically decreasing in terms of performance.

Also, in one embodiment, the maximum image quality may be determined utilizing an analog approach. For example, a plurality of adjustment elements, a "bang-for-buck" indicator, and "fail" indicator may be provided. In another example, each adjustment element may represent one property in the application. In yet another example, each adjustment element may be adjusted in discrete steps. In another embodiment, the "bang-for-buck" indicator may return an overall value (e.g., an image quality times a frame rate) for a present preset. In yet another embodiment, the "fail" indicator may be activated if and only if the preset is invalid. This may be needed if there are dependent variables, and some presets are indeed invalid.

For example, two adjustment elements A and B may have stops False and True, but adjustment element B may only be set to True if and only if adjustment element A is also set to True. In such case, the "fail" indicator may be activated only when adjustment element A is set to False, and adjustment element B is set to True. In another embodiment, it may be assumed that stops are ordered such that adjusting an adjustment element up one stop always results in equal/better image quality, and equal/worse performance.

Additionally, in one embodiment, in a simultaneous manner for each of the parameter variations, a monotonic set determination algorithm may start with all adjustment elements turned all the way down to their minimum levels (i.e., their "minset" values). Now, one adjustment element at a time, each adjustment element may be temporarily incrementally turned up exactly one stop to its maximum value (e.g., if the adjustment element is turned all the way to 10 out of 10, it will not turn to 11). If the "fail" indicator doesn't activate, the "bang-for-buck" indicator value may be recorded, before setting that adjustment element back to its original position. Once all adjustment elements have been incrementally turned up, the element which produced the highest "bang-for-buck" indicator value (and was still valid) is permanently adjusted one stop. This process may be repeated in this way until all adjustment elements are at their maximum setting (i.e. their "maxset" values). The sequence of (# Stops–# adjustment elements+1) presets which were chosen may represent optimal monotonic presets.

Further, in another embodiment, in a simultaneous manner for each of the parameter variations, a monotonic set determination algorithm may start with all adjustment elements turned all the way up to their maximum levels (i.e., their "maxset" values). Now, one adjustment element at a time, each adjustment element may be temporarily incrementally turned down exactly one stop. If the "fail" indicator doesn't activate, the "bang-for-buck" indicator value may be recorded, before setting that adjustment element back to its original position. Once all adjustment elements have been incrementally turned down, the element which produced the highest "bang-for-buck" indicator value (and was still valid) is permanently adjusted one stop. This process may be repeated in this way until all adjustment elements are at their maximum setting (i.e. their "maxset" values).

Further still, in one embodiment, in a simultaneous manner for each of the parameter variations, one or more of the monotonic set determination algorithms may start with all adjustment elements turned all the way down to their minimum levels, and one or more of the monotonic set determination algorithms may start with all adjustment elements turned all the way up to their maximum levels. Additionally, adjustments may be incrementally made by each of the algorithms until the adjustments converge. In this way, optimal preset settings may be determined in an expedited manner. Additionally, faster configurations may influence preset settings that are of importance to them and may avoid preset settings associated with slower configurations.

Also, in one embodiment, each of the plurality of nodes in the DAG may vote on which adjustment element to manipulate (e.g., increase or decrease, etc.). For example, each of the plurality of nodes in the DAG may cast one vote as to which adjustment element may be temporarily incrementally turned up or down exactly one stop for each of the parameter variations corresponding to the nodes in the DAG. In another embodiment, the adjustment element obtaining the largest number of votes may be selected to be incrementally turned up or down for each node.

In another embodiment, each node's vote may be adjusted according to the population value and index value associated with that node. For example, each node's vote may be increased in proportion to its population value and may be increased or decreased according to its index value. In this way, more popular and more relevant nodes in the DAG may be given a greater weight during voting.

In addition, optimal preset settings may be determined for each of the plurality of parameter variations simultaneously, where such presets may range from a lowest setting (e. "minset," etc.) to the highest setting (e.g., "maxset," etc.) and which may maximize "bang-for-buck" (e.g., image quality per performance unit, etc.) at every step along the way. Further, the order of the monotonic plurality of presets may be maintained such that monotonicity of performance and image quality may be guaranteed if parameter enumerants are each ordered in same. Further, optimal preset settings for the plurality of parameter variations may be determined, such that image quality may be maximized with respect to performance cost for each of the optimal preset settings.

Figure 3:
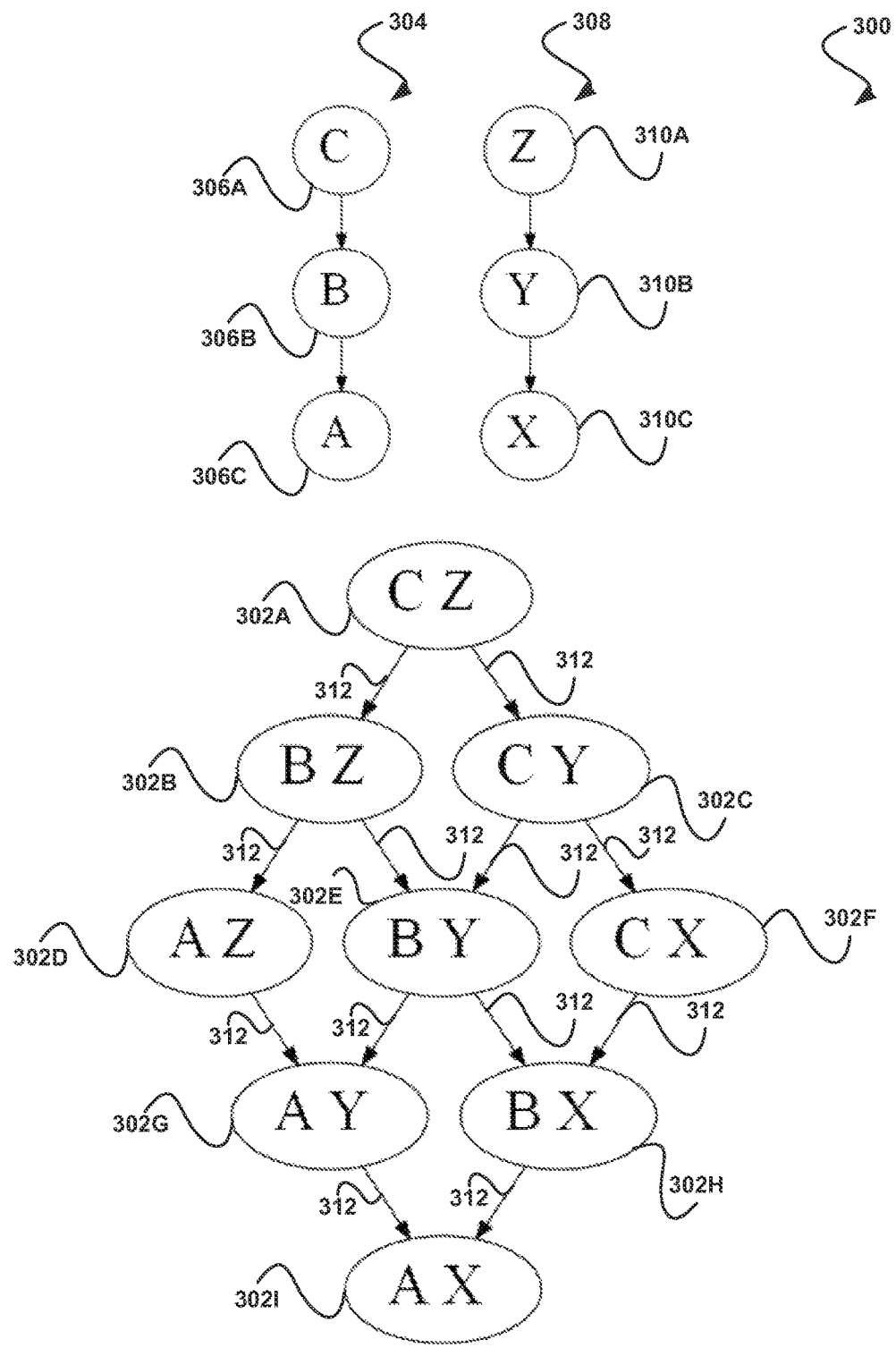
FIG. 3 shows an exemplary parameter DAG, in accordance with another embodiment.

FIG. 3 shows an exemplary parameter DAG 300, in accordance with another embodiment. As an option, the exemplary parameter DAG 300 may be carried out in the context of the functionality of FIGS. 1-2. Of course, however, the exemplary parameter DAG 300 may be implemented in any desired environment. It should also be noted that the aforementioned definitions may apply during the present description.

As shown, the exemplary parameter DAG 300 includes a plurality of nodes 302A-1 that each correspond to a unique combination of a first set 304 of variations 306A-C of a first component (e.g., a CPU type, etc.) of a personal computer and a second set 308 of variations 310A-C of a second component (e.g., a GPU type) of the personal computer. In one embodiment, the DAG 300 may include a directed graph with no directed cycles formed by the collection of nodes 302A-1 (e.g., vertices, etc.) and a plurality of directed edges 312, such that there is no way to start at any node in the DAG 300 and follow a sequence of edges that eventually loops back that starting node again.

Additionally, the nodes in both the first set 304 of variations 306A-C of the first component and the second set 308 of variations 310A-C of the second component are directed based on processing speed, with slower nodes pointing to faster nodes. As such, the first node 306A is the slowest node in the first set 304, the second node 306B is faster than the first node 306A but slower than the third node 306C in the first set 304, and the third node 306C is the fastest node in the first set 304.

In one embodiment, the speed of each of the nodes 302A-I may be determined utilizing one or more algorithms, benchmark tests, manufacturer disclosures, etc. In another embodiment, the location of the nodes 302A-1 within the DAG 300 (including which nodes point to which nodes) may be determined by analyzing properties of components in each node and comparing the overall processing speed of each of the nodes 302A-1.

Additionally, as shown, directed edges 312 point from nodes corresponding to slower unique combinations of parameter variations of the personal computer to nodes corresponding to unambiguously faster unique combinations of parameter variations of the personal computer. In this way, the bottom node 302I corresponds to the fastest unique combination of parameter variations of the personal computer, whereas the top node 302A corresponds to the slowest unique combination of parameter variations of the personal computer.

Figure 4:
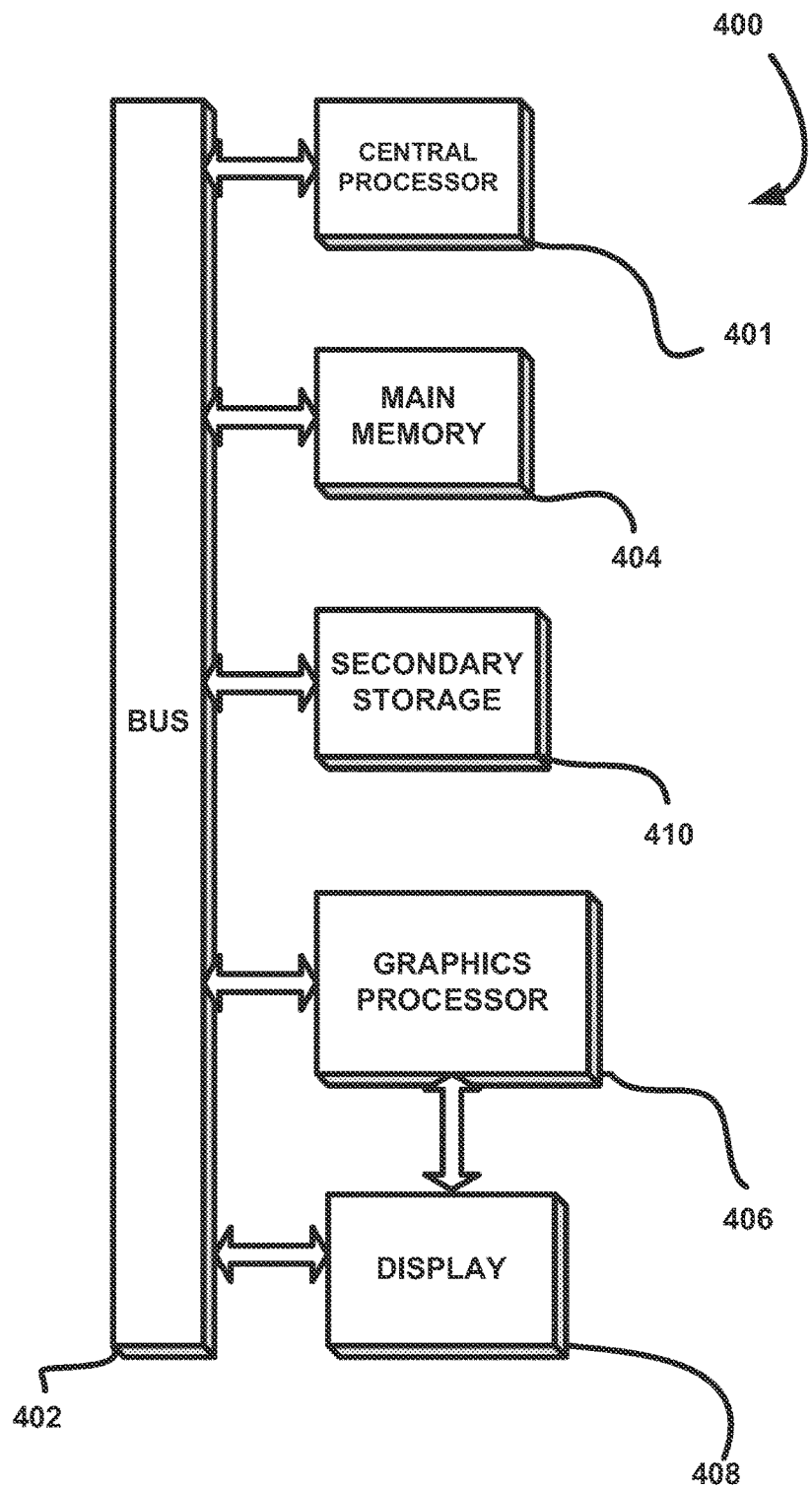
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
storing, by a system, a plurality of first component variations for a first type of hardware component capable of being included in a hardware device and a plurality of second component variations for a second type of hardware component capable of being included in the hardware device, wherein the first type of hardware component is a graphics processing unit and the second type of hardware component is a central processing unit;
generating, by the system, a plurality of unique hardware component combinations based on the first component variations and the second component variations;
assigning, by the system, a population value to each unique hardware component combination of the plurality of unique hardware component combinations, the population value determined based on a number of users each having the unique hardware component combination installed within their personal device;
simultaneously determining, by the system for each of two or more of the unique hardware component combinations, optimal settings for one of the first hardware variations included in the unique hardware component combination and one of the second hardware variations included in the unique hardware component combination, by:
initializing a first value of a first setting for the first type of hardware component and a second value of a second setting for the second type of hardware component,
incrementally adjusting at least one of the first value or the second value, based on the population values assigned to each of the two or more of the unique hardware component combinations, and
for each incremental adjustment resulting in current potential settings, determining for which of the unique hardware component combinations the current potential settings are optimal.

2. The method of claim 1, wherein generating, by the system, the plurality of unique hardware component combinations based on the first component variations and the second component variations includes generating a directed acyclic graph (DAG) including a plurality of nodes, where each node of the plurality of nodes represents one of the plurality of unique hardware component combinations.

3. The method of claim 2, wherein the DAG is generated such that each first node in the DAG that points to a second node in the DAG signifies that the unique hardware component combination represented by the second node offers definitively improved processing speed and performance than the unique hardware component combination represented by the first node.

4. The method of claim 1, further comprising:
assigning, by the system, an index value to each unique hardware component combination of the plurality of unique hardware component combinations, the index value representing an ability of the unique hardware component combination.

5. The method of claim 4, wherein the ability is to run a predetermined software element at a predetermined frame rate.

6. The method of claim 4, wherein the ability is a processing speed and performance.

7. The method of claim 4, wherein incrementally adjusting the at least one of the first value or the second value is further based on the index values assigned to each of the two or more of the unique hardware component combinations.

8. The method of claim 1, wherein the optimal settings are optimal preset settings.

9. The method of claim 1, wherein the optimal settings maximize a first operating characteristic of the hardware device at an expense of a second operating characteristic of the hardware device.

10. The method of claim 9, wherein the first operating characteristic is an image quality and the second operating characteristic is a performance.

11. The method of claim 1, wherein the optimal settings for each of the two or more unique hardware component combination include a first configuration for the one of the first hardware variations included in the unique hardware component combination and a second configuration for the one of the second hardware variations included in the unique hardware component combination.

12. The method of claim 1, wherein the incrementally adjusting the at least one of the first value or the second value includes incrementally increasing, from a minimum setting amount, the at least one of the first value or the second value.

13. The method of claim 1, wherein the incrementally adjusting the at least one of the first value or the second value includes incrementally decreasing, from a maximum setting amount, the at least one of the first value or the second value.

14. The method of claim 1, wherein the at least one of the first value or the second value is selected for being incrementally adjusted based on the population values assigned to each of the two or more of the unique hardware component combinations.

15. The method of claim 1, further comprising:
storing, by the system, a plurality of third component variations for a third type of hardware component capable of being included in the hardware device;
wherein the plurality of unique hardware component combinations are further generated based on the third component variations.

16. The method of claim 15, wherein the third type of hardware component is a display.

17. The method of claim 15, wherein the third type of hardware component is a random access memory.

18. A non-transitory computer readable medium storing code that, when executed by a system, causes the system to perform a method comprising:
storing, by the system, a plurality of first component variations for a first type of hardware component capable of being included in a hardware device and a plurality of second component variations for a second type of hardware component capable of being included in the hardware device, wherein the first type of hardware component is a display and the second type of hardware component is random access memory;

generating, by the system, a plurality of unique hardware component combinations based on the first component variations and the second component variations;

assigning, by the system, a population value to each unique hardware component combination of the plurality of unique hardware component combinations, the population value determined based on a number of users each having the unique hardware component combination installed within their personal device;

simultaneously determining, by the system for each of two or more of the unique hardware component combinations, optimal settings for one of the first hardware variations included in the unique hardware component combination and one of the second hardware variations included in the unique hardware component combination, by:

- initializing a first value of a first setting for the first type of hardware component and a second value of a second setting for the second type of hardware component,
- incrementally adjusting at least one of the first value or the second value, based on the population values assigned to each of the two or more of the unique hardware component combinations, and
- for each incremental adjustment resulting in current potential settings, determining for which of the unique hardware component combinations the current potential settings are optimal.

19. The non-transitory computer readable medium of claim 18, further comprising:

storing, by the system, a plurality of third component variations for a third type of hardware component capable of being included in the hardware device;

wherein the plurality of unique hardware component combinations are further generated based on the third component variations.

20. The non-transitory computer readable medium of claim 19, wherein the third type of hardware component is a graphics processing unit.

21. The non-transitory computer readable medium of claim 19, wherein the third type of hardware component is a central processing unit.

22. A system, comprising:

a memory storing instructions; and a processor configured to execute the instructions to perform a method comprising:

storing, by the system, a plurality of first component variations for a first type of hardware component capable of being included in a hardware device and a plurality of second component variations for a second type of hardware component capable of being included in the hardware device, wherein the first type of hardware component is a display and the second type of hardware component is graphics processing unit;

generating, by the system, a plurality of unique hardware component combinations based on the first component variations and the second component variations;

assigning, by the system, a population value to each unique hardware component combination of the plurality of unique hardware component combinations, the population value determined based on a number of users each having the unique hardware component combination installed within their personal device;

simultaneously determining, by the system for each of two or more of the unique hardware component combinations, optimal settings for one of the first hardware variations included in the unique hardware component combination and one of the second hardware variations included in the unique hardware component combination, by:

- initializing a first value of a first setting for the first type of hardware component and a second value of a second setting for the second type of hardware component,
- incrementally adjusting at least one of the first value or the second value, based on the population values assigned to each of the two or more of the unique hardware component combinations, and for each incremental adjustment resulting in current potential settings, determining for which of the unique hardware component combinations the current potential settings are optimal.

23. The system of claim 22, further comprising:

storing, by the system, a plurality of third component variations for a third type of hardware component capable of being included in the hardware device;

wherein the plurality of unique hardware component combinations are further generated based on the third component variations.

24. The system of claim 23, wherein the third type of hardware component is a central processing unit.

25. The system of claim 23, wherein the third type of hardware component is a random access memory.

* * * * *